(12) United States Patent
Sebastian

(10) Patent No.: US 7,297,264 B2
(45) Date of Patent: Nov. 20, 2007

(54) APPARATUS AND METHOD OF WATER TREATMENT WITH PRELIMINARY SCREEN

(75) Inventor: Greg A. Sebastian, Eagan, MN (US)

(73) Assignee: EcoWater Systems, LLC, Woodbury, MN (US)

( * ) Notice: Subject to any disclaimer, the term of this patent is extended or adjusted under 35 U.S.C. 154(b) by 18 days.

(21) Appl. No.: 11/188,562

(22) Filed: Jul. 25, 2005

(65) Prior Publication Data

US 2006/0037900 A1 Feb. 23, 2006

Related U.S. Application Data

(60) Provisional application No. 60/590,524, filed on Jul. 23, 2004.

(51) Int. Cl.
*C02F 1/42* (2006.01)
*B01D 24/14* (2006.01)
*B01D 24/40* (2006.01)

(52) U.S. Cl. .......... 210/288; 210/190; 210/191
(58) Field of Classification Search ........ 210/190, 210/191, 288
See application file for complete search history.

(56) References Cited

U.S. PATENT DOCUMENTS

| 2,973,097 | A | * | 2/1961 | Snider ............ 210/279 |
| 3,809,247 | A | * | 5/1974 | Brett ............. 210/278 |
| 4,136,032 | A |   | 1/1979 | Bakken et al. |
| 4,228,000 | A | * | 10/1980 | Hoeschler ........ 210/673 |
| 5,162,080 | A |   | 11/1992 | Drager et al. |
| 6,696,963 | B2|   | 2/2004 | Zimmerman et al. |

* cited by examiner

*Primary Examiner*—Thomas M. Lithgow

(74) *Attorney, Agent, or Firm*—Patzik, Frank & Samotny Ltd

(57) ABSTRACT

The present invention provides a water treatment system, such as a water softener, with a resin tank having a top distributor with a preliminary screen and second screen. The preliminary screen provides added protection by reducing the chance of larger particles from entering the various valves and screens. Prior to the regeneration cycle, an additional back wash and fast rinse cycle are added to rinse sediment to the drain and to clean the preliminary screen.

9 Claims, 3 Drawing Sheets

APPARATUS AND METHOD OF WATER TREATMENT WITH PRELIMINARY SCREEN

CROSS-REFERENCE TO RELATED APPLICATION

This application claims the benefit of U.S. Provisional Application No. 60/590,524, filed Jul. 23, 2004.

FIELD OF THE INVENTION

The invention relates generally to water treatment systems and particularly to water softeners having a top regulator.

BACKGROUND OF THE INVENTION

Domestic water softeners remove hardness from raw water by passing it through a tank containing a liquid treatment medium bed, typically formed of resin beads. A salt solution, that is brine, is passed through the resin bed to restore its softening capacity. The brine is formed in a container which is connected by a liquid flow passage to the tank containing the resin beads. The flow of liquid through the liquid flow passage is regulated by a control valve which is actuated by an electronic regeneration control circuit.

Salt, typically in the form of chunks or pellets, is placed in the container. Under the control of the electronic regeneration control circuit, the control valve allows a predetermined amount of water to enter the container. Provided enough salt is present, the water and salt form a saturated salt solution, or brine, which is the regenerant for the resin bed. Again, under the control of the electronic regeneration control circuit, the control valve is actuated to cause the brine to be withdrawn from the container and circulated through, and thereby regenerate, the resin in the tank.

The flow control valve for such apparatus must accurately control the volume and velocity of liquid flowing through the resin particles in the treatment tank and in the brining system during each of four or more cycles. The regeneration cycle preferably includes the following steps: (1) fill; (2) brine draw; (3) slow rinse; (4) backwash; and (5) fast rinse.

U.S. Pat. Nos. 4,136,032, 5,162,080 and 6,696,963 are directed to water treatment systems and are incorporated herein by reference. The patents disclose water treatment systems and water softeners. The prior art includes water softeners wherein the resin tank is located adjacent the salt storage or brine tank, and water softeners wherein the resin tank is located in the brine tank.

The prior art includes a top distributor located in the resin tank. While the water softener is in service, hard water enters the resin tank via the control valve and the top distributor. Any particulates or contaminants located in the hard water will ideally be trapped within the lower recess of the top distributor. The lower recess is often in an area between two walls having a spaced apart relation which narrows in the direction downward and towards the lower recess.

SUMMARY OF THE INVENTION

The present invention includes a water softener, comprising a resin tank having an upper opening, a top distributor located at the upper opening. The top distributor having an generally cylindrical-shaped outer wall and a generally cylindrical-shaped inner wall. A first fluid channel is formed by the outer and inner wall and includes a generally annular shape. The first fluid channel having a first opening and a second opening. A second fluid channel is formed by the inner wall. A preliminary screen is located at the first opening, and a second screen located at the second opening. The second fluid channel having a first opening and a second opening. A control valve is coupled to the resin tank and the top distributor. A pipe having one end coupled to the second opening of the second fluid channel of the top distributor and another pipe end extending downwardly from the top distributor. A bottom distributor is coupled to the other end of the pipe.

In one embodiment, the preliminary screen includes a new molded and stainless steel screen which fits into a molded plastic top distributor. In one embodiment, the molded plastic basket provides long slots which are coarser in comparison to the stainless steel screen. The preliminary screen reduces the chance of larger particles from entering the systems various valves and screens.

The present invention also provides a method of regeneration of a water softener, wherein the water softener includes a top distributor with a preliminary screen. The method includes a back wash step, a fast rinse step, a fill step, a brine draw step, a slow rinse step, a back wash step, and a fast rinse step. The initial back wash and fast rinse steps rinses particles to the drain before the regeneration steps, and rinses the preliminary screen.

DETAILED DESCRIPTION OF THE INVENTION

Figure 1:
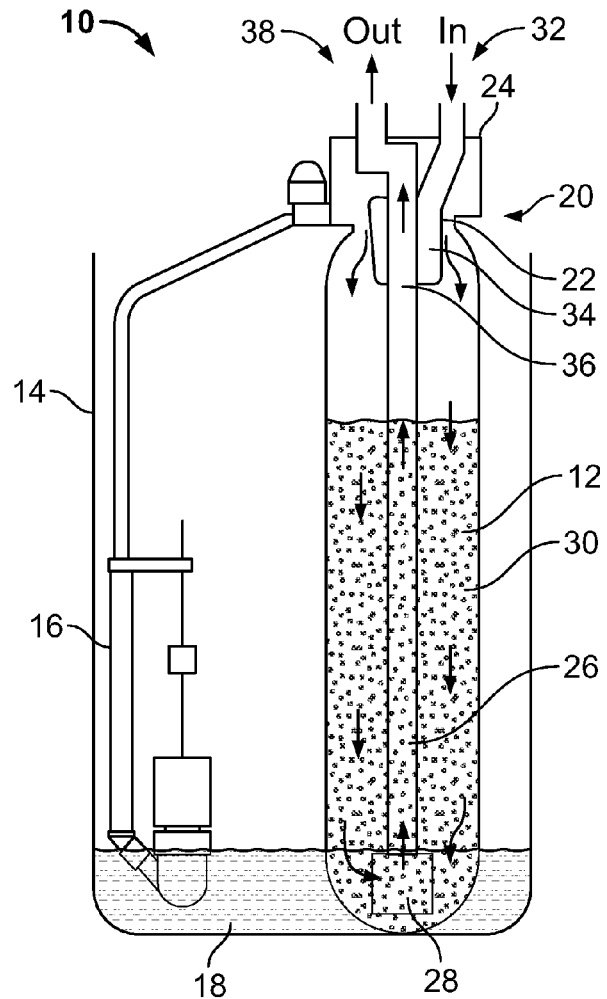
FIG. 1 is a schematic diagram of a water softener with the top distributor in accordance with the present invention, showing the water flow direction while the system is in service.

FIG. 1 shows a water softener 10 in accordance with one embodiment of the present invention. A resin tank 12 is located within a salt storage or brine tank 14. A brine valve 16 couples the brine 18 to the resin tank. The resin tank includes an upper opening 20 wherein a top distributor 22 and a valve controller 24 are secured. A pipe 26 extends from the top distributor down to a bottom distributor 28 located in a resin bed 30. FIG. 1 shows the fluid flow direction while the water softener is in service. The valve controller includes an inlet 32 for receiving hard water. The hard water enters the valve controller and then the top distributor via a first fluid channel 34, whereupon the hard water enters the resin tank. Soft water enters the bottom distributor and flows up the pipe through a second fluid channel 36 of the top distributor. The soft water then enters the valve controller and exists via an outlet, whereupon the soft water is stored in a storage tank (not shown) and made available for use on demand.

Figure 2:
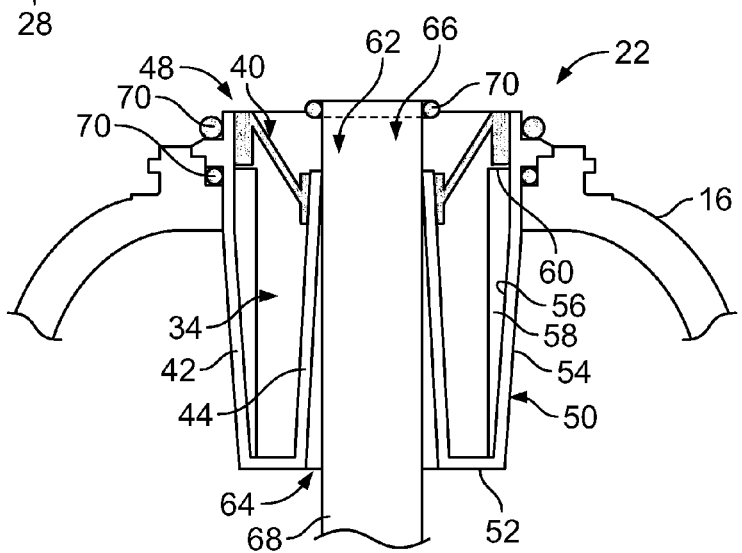
FIG. 2 is a cross sectional diagram of the upper section of the brine tank and top distributor with preliminary screen of FIG. 1, in accordance with the present invention.

FIG. 2 is a cross sectional diagram of the upper section of the brine tank and top distributor with preliminary screen 40, in accordance with one embodiment of the present invention. The top distributor includes a generally cylindrical shaped outer wall 42 which includes a portion having a conical shape which tapers in a downward direction as viewed in FIG. 2. The top distributor includes a generally cylindrical shaped inner wall 44 which includes a portion having a conical shape which tapers in an upward direction. The first fluid channel 34 is formed between the inner and outer walls. The top distributor includes a first opening 48 to the first fluid channel. A first screen or the preliminary screen 40 is located at the first opening. The outer wall includes a portion having a perforated wall 50 which provides a second opening and a second screen for the first fluid channel. An end wall 52 extending between the inner wall and outer wall closes off the bottom portion of the first fluid channel.

The outer wall includes an outer face 54 and an inner face 56. Ribs 58 extend in a longitudinal direction along the inner face and terminate at an abutment 60.

The inner wall provides a bore or second fluid channel 62. The lower portion of the second fluid channel provides a first opening 64 of the second fluid channel. The upper portion of the second fluid channel provides a second opening 66. It can be seen in the embodiment of FIG. 2 that one end 68 of the pipe extends through the second fluid channel. Three seals or O-rings 70 are shown to seal the various components shown in FIG. 2 and the valve controller (not shown in FIG. 2).

FIG. 2 shows one embodiment, wherein the preliminary screen includes a molded body with the steel screen molded within the body. The preliminary screen is separate from the other features of the top distributor which are formed of a single molded component.

Figure 3:
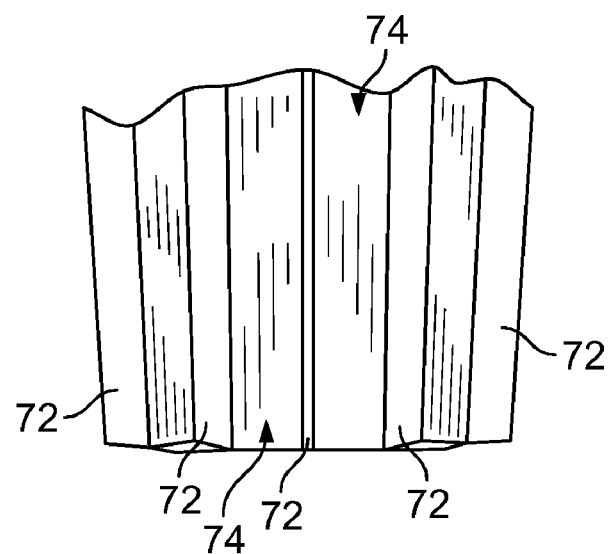
FIG. 3 is a partial lower view of a side view of the top distributor showing the perforated wall and ribs.

FIG. 3 is a partial lower side view of the top distributor of one embodiment, wherein the outer face includes longitudinal ribs 72 which may continue to the ribs 58 on the inner face. Longitudinal slots 74 are shown which provide the perforated wall. However, the perforated wall can take other forms.

Figure 4:
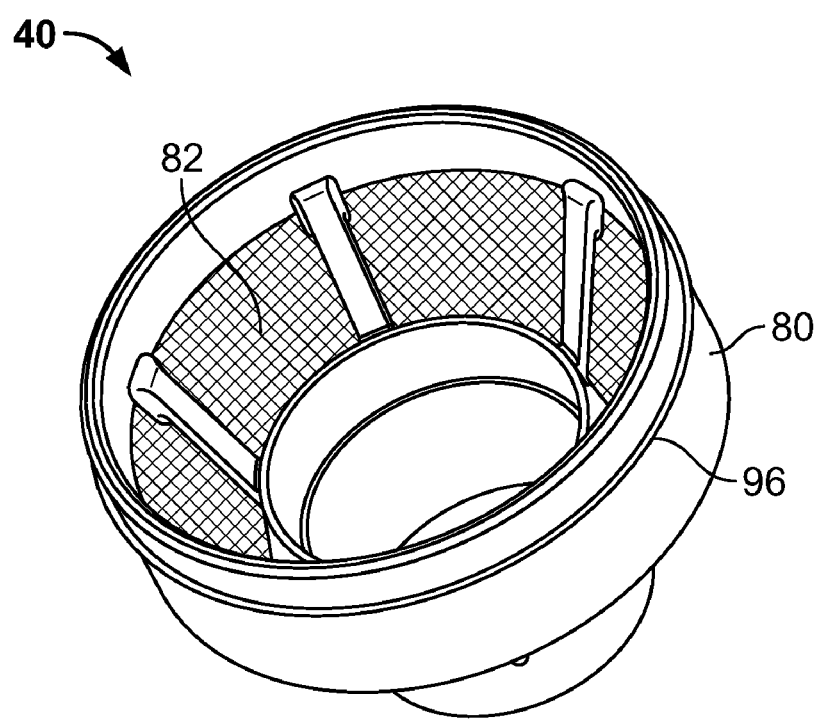
FIG. 4 is a perspective view of a preliminary screen of FIG. 2, in accordance with the present invention.
Figure 5:
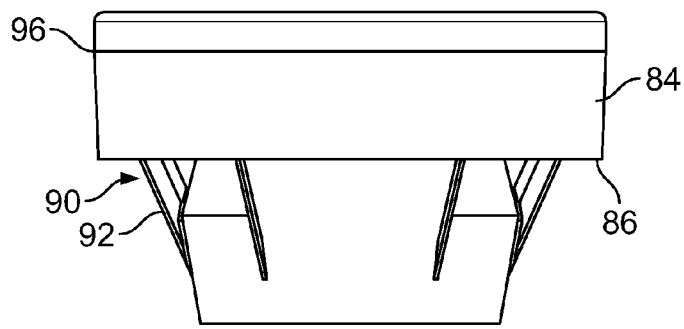
FIG. 5 is a side view of the preliminary screen of FIG. 3.
Figure 6:
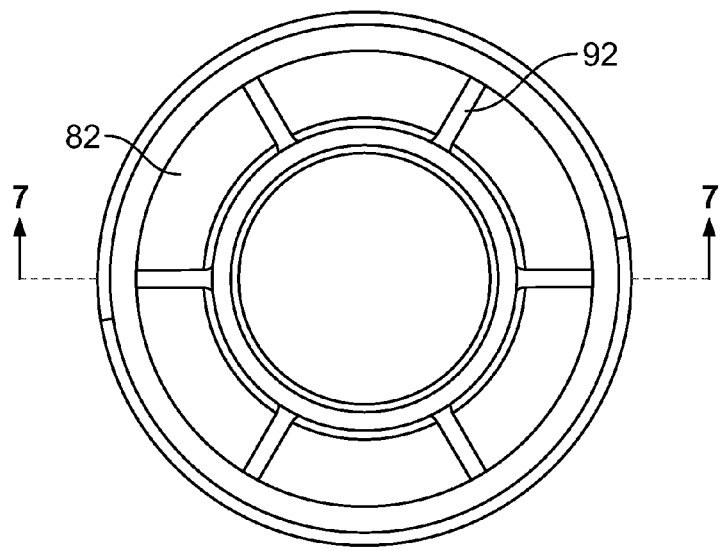
FIG. 6 is a top plan view of the preliminary screen of FIG. 3.
Figure 7:
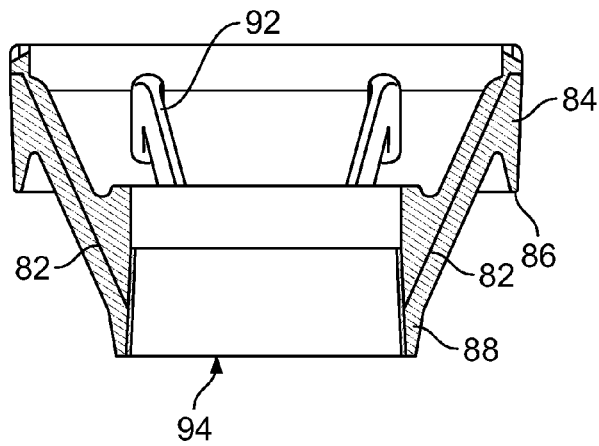
FIG. 7 is a cross sectional view of the preliminary screen taken along line 6-6 of FIG. 5.

FIG. 4 shows a perspective view of a preliminary screen 40 of FIG. 2, in accordance with the present invention. In one embodiment, the screen includes a molded body 80 with a stainless steel screen 82 molded within the body. FIG. 5 is a side view of the preliminary screen, FIG. 6 is a top plan view and FIG. 7 is a cross sectional view taken along line 7-7 of FIG. 6. Referring to FIGS. 4-7, it can be seen that the preliminary screen includes an outer annular wall 84 which is dimensioned to be received by the outer wall 42 of the top distributor.

The outer annular wall 84 includes a lower edge 86. An inner annular wall 88 is generally axially displaced from the outer annular wall 84 and forms a generally conical shaped annular opening 90. A plurality of inclined ribs 92 extend between and connect the outer annular wall 84 and the inner annular wall 88. The stainless steel screen 82 may be embedded within the ribs 92 during the molding of the preliminary screen body 80. The inner annular wall 88 includes a lower opening 94 which has a conical profile and is dimensioned to received an upper portion of the inner wall 44. A flexible self-aligning lip seal 96 extends about the periphery of the outer annular wall 84 and provides a self-aligning seal feature with the inner face 56 of the outer wall 42.

The regeneration cycle preferably includes the following steps: (1) back wash; (2) fast rinse; (3) fill; (4) brine draw; (5) slow rinse; (6) backwash; and (7) fast rinse. The initial back wash and fast rinse steps rinses particles to the drain before the regeneration steps, and rinses the preliminary screen.

What is claimed:

1. A water softener, comprising:
    a resin tank having an upper opening;
    a top distributor located at the upper opening, the top distributor having an generally cylindrical-shaped outer wall and a generally cylindrical-shaped inner wall, a first fluid channel formed by the outer and inner wall and having a generally annular shape, the first fluid channel having a first opening and a second opening, a second fluid channel formed by the inner wall, a preliminary screen located at the first opening, and a second screen located at the second opening, the second fluid channel having a first opening and a second opening;
    a control valve coupled to the resin tank and the top distributor;
    a pipe having one end extending through the second fluid channel of the top distributor and another pipe end extending downwardly from the top distributor; and
    a bottom distributor coupled to the other end of the pipe.

2. The water softener of claim 1, wherein the inner wall forms a centrally located cylindrical tube and bore which forms the second fluid channel.

3. The water softener of claim 1, wherein the outer wall includes a perforated wall which forms the second screen.

4. The water softener of claim 1, wherein the preliminary screen includes a stainless steel screen.

5. The water softener of claim 1, further comprising a plurality of abutments located within the first fluid channel and adjacent the first opening of the first fluid channel, and the preliminary screen includes an outer annular wall, the outer annular wall having a depending annular lower edge, wherein the annular lower edge limits the displacement of the preliminary screen within the top distributor.

6. The water softener of claim 5, wherein the cylindrical-shaped outer wall includes an inner face, the plurality of abutments extend from the inner face, each forming an abutment edge which faces outward of the first opening of the first fluid channel.

7. A water softener, comprising:
    a resin tank having an upper opening;
    a top distributor located at the upper opening, the top distributor having an generally cylindrical-shaped outer wall and a generally cylindrical-shaped inner wall, a first fluid channel formed by the outer and inner wall and having a generally annular shape, the first fluid channel having a first opening and a second opening, a second fluid channel formed by the inner wall, a preliminary screen located at the first opening, and a second screen located at the second opening, the second fluid channel having a first opening and a second opening;
    a control valve coupled to the resin tank and the top distributor;
    a pipe having one end extending through the second fluid channel of the top distributor and another pipe end extending downwardly from the top distributor; and
    a bottom distributor coupled to the other end of the pipe;
    wherein the preliminary screen includes an outer annular wall, an inner annular wall disposed from the outer annular wall and forming a conical shaped annular opening, a plurality of ribs extending between and coupling the outer annular wall to the inner annular wall, and a stainless steel screen extending between the outer annular wall and the inner annular wall and closing off the conical shaped annular opening.

8. The water softener of claim 7, wherein the stainless screen is embedded in the plurality of ribs.

9. The water softener of claim 1, wherein the cylindrical-shaped outer wall includes an outer face, and a flexible self-aligning lip seal extends around the circumference of the outer face.

* * * * *